(No Model.)
T. SMITH.
BICYCLE TIRE.
No. 576,168.  Patented Feb. 2, 1897.
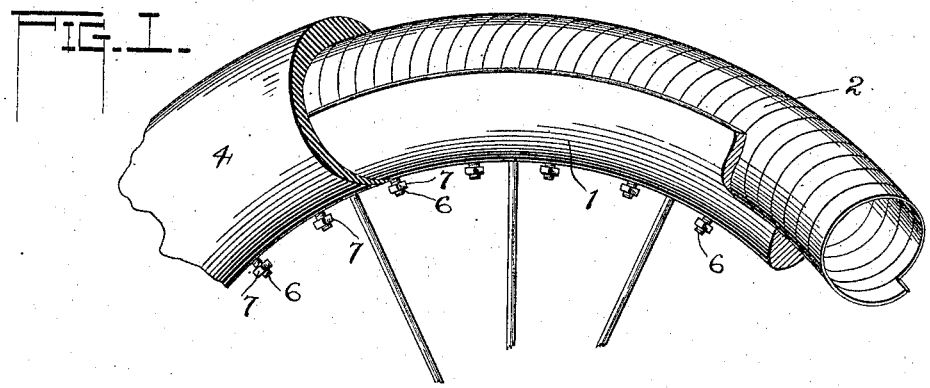
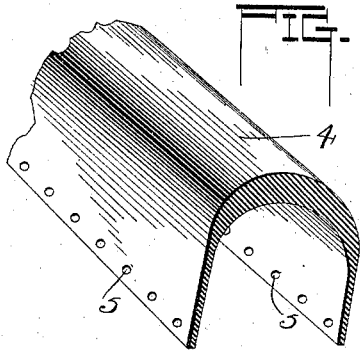
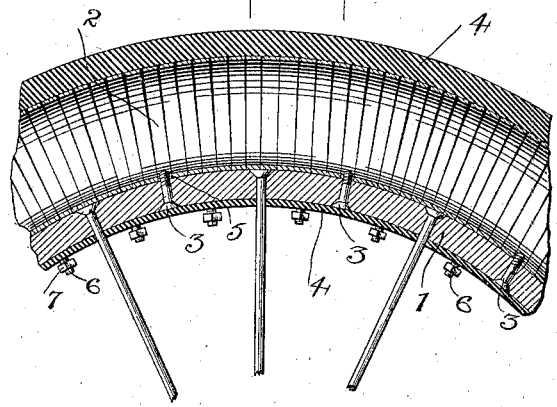
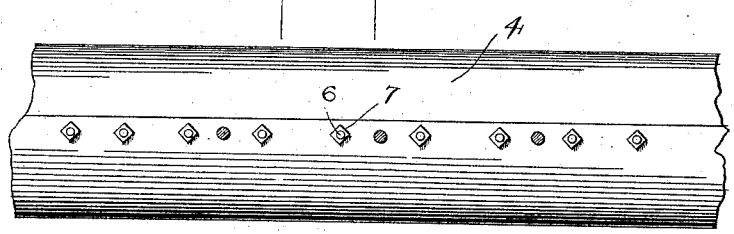
Witnesses  
Inventor  
Thomas Smith,  
By his Attorneys,

UNITED STATES PATENT OFFICE.

THOMAS SMITH, OF JACKSONVILLE, FLORIDA, ASSIGNOR OF ONE-HALF TO CHARLES BLUM, OF SAME PLACE.

BICYCLE-TIRE.

SPECIFICATION forming part of Letters Patent No. 576,168, dated February 2, 1897.

Application filed February 10, 1896. Serial No. 578,748. (No model.)

*To all whom it may concern:*

Be it known that I, THOMAS SMITH, a citizen of the United States, residing at Jacksonville, in the county of Duval and State of Florida, have invented a new and useful Bicycle-Tire, of which the following is a specification.

This invention relates to an improvement in vehicle-wheel tires, and is especially designed for use in connection with bicycles.

The object of the present invention is to dispense with the ordinary pneumatic tire and the disadvantages incident to the use thereof, such as puncturing and frequent repair, and to provide a mechanically elastic or resilient tire which will not be affected by puncturing and which will not require to be repaired before the rider can proceed farther.

A further object of the invention is to so construct and apply the improved tire to the rim of a wheel that access may be readily obtained to all parts thereof.

To this end the invention consists in an improved tire embodying certain novel features and details of construction, as hereinafter fully described, illustrated in the drawings, and finally pointed out in the claim.

In the accompanying drawings, Figure 1 is a sectional perspective view of a portion of a wheel-rim, &c., showing the improved tire applied thereto. Fig. 2 is a fragmentary perspective view of the tire or tread proper. Fig. 3 is a longitudinal section through a portion of the wheel rim and tire, showing the manner of retaining the coiled spring in place. Fig. 4 is a plan view of a portion of the inner surface of the wheel-rim, showing the manner of securing the overlapping edges of the outer case or cover of the tire.

Similar numerals of reference designate corresponding parts in the several figures of the drawings.

Referring to the accompanying drawings, 1 designates a wheel-rim, which for the purpose of the present invention is of that form known as "crescent," being concavo-convex in cross-section. Within the concaved periphery of this rim is placed a coiled or spirally-wound spring 2, preferably of steel and made from a continuous flat ribbon having the desired degree of elasticity, so that it will yield readily at the point of impact for absorbing the jar that would otherwise be communicated to the wheel in traveling over a rough and broken surface. This coiled spring extends circumferentially entirely around the wheel-rim, and is provided at intervals, preferably of four or five inches, with openings in its coils which are adapted to receive the inner ends of a number of screws 3, which pass through openings in the rim at intervals corresponding to the openings in the coils of the spring. The rim 1, whether of wood or metal, is countersunk upon its inner surface, and the heads of the screws 3 are received thereby within the plane of the rim, so as to be flush therewith and to present a smooth, unbroken surface, over which the ends of the outer case or cover may be lapped.

The outer case or cover 4 also extends circumferentially entirely around the rim of the wheel and also passes transversely around the rim, so as to embrace and inclose both the rim 1 and the spring 2. The central portion of the outer case or cover is considerably thickened or reinforced, thus constituting a soft and resilient tread to the tire, the cover 4 being preferably of soft rubber lined inside with canvas or not, as may be found most expedient. The opposite edges of the cover 4 are perforated at numerous intervals and at correspondingly opposite points, and these perforations (indicated at 5) are adapted to be threaded over a plurality of pins 6, projecting inwardly from the inside surface of the rim. The perforations at one edge of the cover 4 are engaged over the pins 6, and the opposite edge of the cover is then lapped over the first edge and its perforations engaged with the pins 6. Nuts 7 are then screwed inward and tightened upon the pins 6 and against the overlapping edges of the cover 4, thus completing the application of the tire.

From the foregoing description it will be seen that the improved tire is quite simple and that it may be manufactured at low cost and also that it attains material advantages over the ordinary pneumatic tires, as a puncture of the outer case or cover will not render the tire unfit for use and necessitate immediate repair. In fact, the improved tire requires no repairing and may be ridden continuously until worn out. In the event of the spring breaking, which might occur upon an unusual shock, the cover 4 may be readily removed, as also the spring 2, and a new spring may be substituted for the old one.

I do not wish to be limited to the use of a continuous steel ribbon in the construction of the spring, and it will be apparent that other changes in the form, proportion, and minor details of construction may be resorted to without departing from the spirit or sacrificing any of the advantages of this invention.

Having thus described the invention, what is claimed as new is—

In a tire, the combination with a rim provided at intervals along its inner surface and centrally thereof with inwardly-extending threaded projections, of a continuous coiled flat ribbon-spring having the edges of its contiguous coils in contact with each other and seated directly in and bearing against the rim and extending longitudinally around the same, screws passing through the rim from the inside and engaging threaded openings at intervals in the coils of said spring, a resilient covering passing continuously around and inclosing both the rim and spring and having its longitudinal edges overlapping each other upon the inner surface of the rim and provided with registering perforations for engaging said projections, and nuts on said threaded projections for binding the edges of the covering against the rim, whereby the covering may be removed for giving access to the spring, substantially as described.

In testimony that I claim the foregoing as my own I have hereto affixed my signature in the presence of two witnesses.

THOMAS SMITH.

Witnesses:
W. R. DE WITT,
L. E. WADE.